J. Stufflebeen,
Mortising Machine.

Nº 51,100.  Patented Nov. 21, 1865.

Witnesses:
W. B. Smith
James Connolly

Inventor:
James Stufflebeen

UNITED STATES PATENT OFFICE.

JAMES STUFFLEBEEN, OF MILWAUKEE, WISCONSIN.

IMPROVEMENT IN MORTISING-MACHINES.

Specification forming part of Letters Patent No. 51,100, dated November 21, 1865.

*To all whom it may concern:*

Be it known that I, JAMES STUFFLEBEEN, of Milwaukee, in the county of Milwaukee and State of Wisconsin, have invented a new and useful Improvement in Machines for Relishing Door-Rails; and I do hereby declare that the following is a full, clear, and exact description of the same, reference being had to the accompanying drawings, forming part of this specification, in which—

Figure 5:
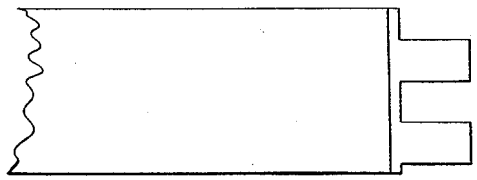
Figure 3:
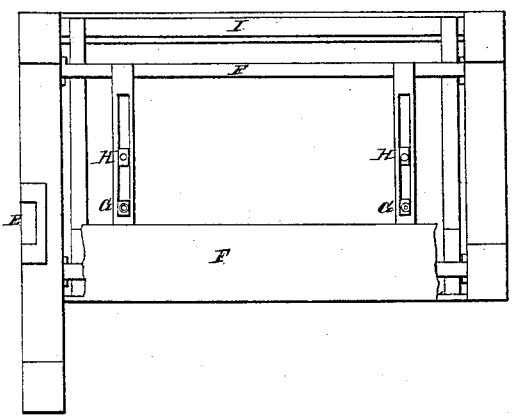
Figure 4:
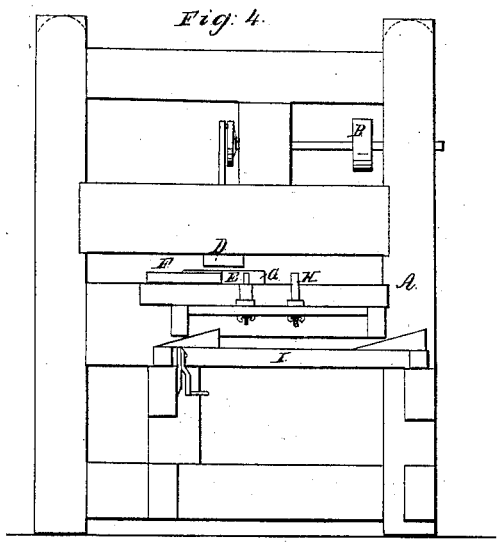
Figure 2:
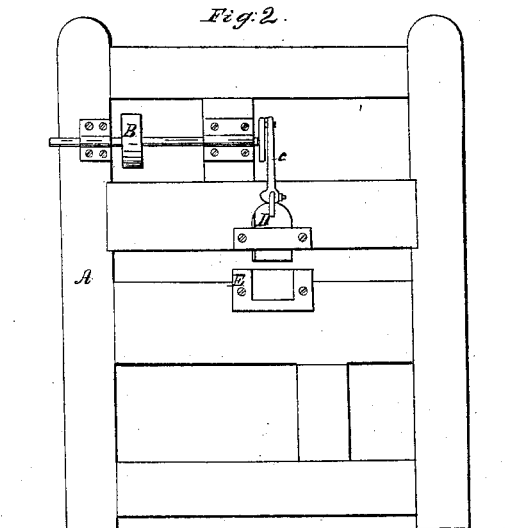

Figure 1 is a perspective view of my improvement as in operation; Fig. 2, an end view; Fig. 3, a plan view. Fig. 4 is a transverse sectional view; and Fig. 5 a door-rail, one end of which is relished and the other end not relished.

Similar letters of reference in each of the figures indicate corresponding parts.

The nature of my invention consists in a novel arrangement of mechanism to relish door-rails or similar work at one operation. It is usual to saw into the rail endwise, and then at another operation cut out the piece as desired; but with my improvement the work is all done at once.

To enable others skilled in the art to make and use my invention, I will proceed to describe its construction and operation.

A is the frame; B, the pulley and shaft to operate the chisel; C, pitman connecting chisel with the shaft; D, chisel; E, die into which the chisel works and on which the door-rail tenon rests when being relished; F, adjustable table; G G, adjustable stops in table F, with springs to keep them up, so as to form a guide for the rail to rest against when being relished, but depressible when the rail is laid on them.

H H are stops without springs, but adjustable also for a guide for the rails as fed up to the chisel. These stops are set in grooves in the table, so that they can be moved laterally as may be desired.

I is a sliding frame under table F, with wedges to raise or lower table according to the thickness of the rails to be relished.

Operation: Set the chisel in motion by a band from a driving-pulley to pulley B. Then lay the rail on table F, with the end of one tenon near the chisel. Then press it against guide-stops G G and feed it up to the chisel, which will cut the center slot or relish. Then withdraw it and place it over stops G G, which will thus be pressed down even with the table and press it against stops H H and feed up to the chisel, when the side relish will be cut down. Then withdraw the rail, change ends, and relish that end in like manner.

What I claim as my invention, and wish to secure by Letters Patent, is—

In a machine for relishing the tenons in doors and similar work, the arrangement of the reciprocating chisel D, die E, stops G G H H, and the means of adjusting the table, substantially as described.

JAMES STUFFLEBEEN.

Witnesses:
   J. B. SMITH,
   JAMES CONNOLLY.